United States Patent [19]

Tran Kiem

[11] Patent Number: 4,631,502
[45] Date of Patent: Dec. 23, 1986

[54] TRANSISTOR MODULATOR FOR CONVERTING VIDEO GAME SIGNALS INTO ANTENNA INPUT SIGNALS FOR A TELEVISION RECEIVER

[75] Inventor: Nguyen Trân Kiêm, Chatillon, France

[73] Assignee: U.S. Philips Corporation, New York, N.Y.

[21] Appl. No.: 798,082

[22] Filed: Nov. 14, 1985

[30] Foreign Application Priority Data

Nov. 20, 1984 [FR] France ................. 84 17669

[51] Int. Cl.[4] .................... H03C 1/36; H03C 3/00
[52] U.S. Cl. .................... 332/16 T; 332/17; 332/31 T; 358/23
[58] Field of Search .............. 332/16 T, 17, 31 T, 332/42, 10, 21, 22, 40, 41; 360/29, 30, 33.1; 358/23

[56] References Cited

U.S. PATENT DOCUMENTS 3,772,614 11/1973 Kjaersgaard ............ 332/16 T
4,160,959 7/1979 Maine .................... 332/31 T Primary Examiner—Eugene R. LaRoche
Assistant Examiner—D. C. Mis
Attorney, Agent, or Firm—Thomas A. Briody; William J. Streeter; Leroy Eason

[57] ABSTRACT

A transistor modulator for use in a circuit for processing video and sound signals of a video game so as to produce a composite output signal for application to the antenna input of a television receiver to produce a display of such video game. The modulator comprises an MOS transistor having a source electrode, a drain electrode and two gate electrodes. The video and sound signals and a VHF carrier signal are applied to respective ones of the two gate electrodes and either of the source and drain electrodes. The MOS transistor produces the composite output signal across an impedance which is connected to the other of the source and drain electrodes.

3 Claims, 1 Drawing Figure

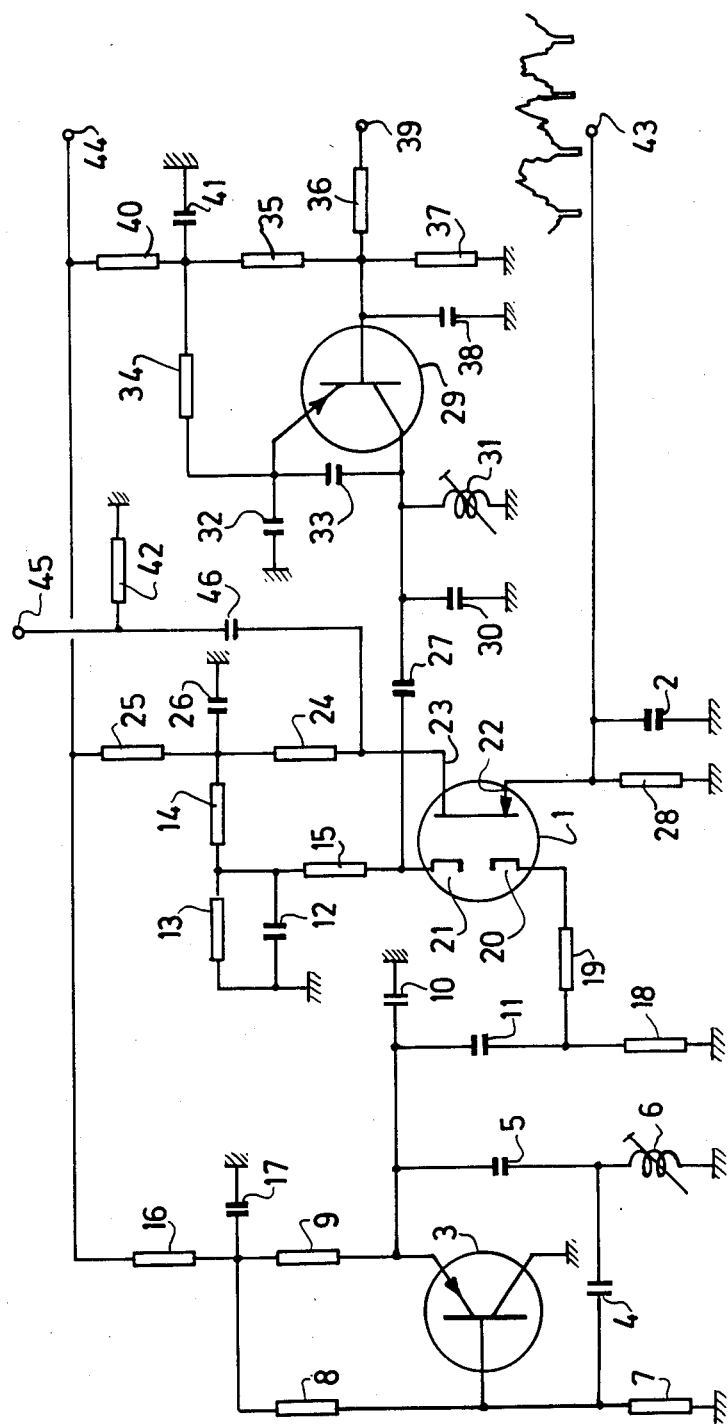

TRANSISTOR MODULATOR FOR CONVERTING VIDEO GAME SIGNALS INTO ANTENNA INPUT SIGNALS FOR A TELEVISION RECEIVER

The invention relates to a television signal modulator particularly adapted for processing video signals produced by synthetic picture generators such as video games or home computers and intended to be applied to the aerial input of a domestic television receiver used as the terminal of said generator.

In certain countries a point which is commonly referred to as the auxiliary terminal permits the direct introduction of colour components of a video signal into the television receiver. However, this auxiliary terminal is not obligatory in all countries and, moreover, old television receivers are not provided with this terminal. Consequently it is necessary in numerous cases to apply the signals to the television receiver through its aerial input. These signals must then modulate a carrier in accordance with the radio transmission standard for which the television receiver is designed. This is accomplished by means of a modulator which causes the amplitude of a very high-frequency carrier to vary as a function of the composite video signal generated by the picture generator.

The current technique in the field modulators is that of the modulators commonly referred to as ring modulators. These modulators use modulator diodes and at least two transformers. They are too costly to be used for leisure purposes as envisaged in this case. Therefore research has led to a simpler structure using MOS transistor modulators. These modulators have a performance which is inferior to that of ring modulators, but they are satisfactory for processing synthetic images which do not require very subtle colour nuances.

A modulator of this type is described, for example, in U.S. Pat. No. 4,160,959. The modulator described in this specification comprises a MOS transistor to whose gate the composite video signal is applied, while the very high-frequency carrier signal is applied to its source electrode via a second transistor which serves as an oscillator and is arranged in a cascode configuration with the first transistor.

The recent video games or home computers provide a sound signal in addition to the picture to enhance their use. The problem then is to add a modulation corresponding to the sound signal. This modulation is not provided in the arrangement described in the above-mentioned specification. An ordinary solution most frequenctly used is to simply and solely add a sound carrier previously modulated somewhere else in the circuit to the picture carrier which is already modulated. This solution is costly because it requires a second modulator. Another solution proposed in French Patent Specification No. 2,417,900 is to successively add both the composite video signal and the frequency of the sound-modulated sound subcarrier and to use the signal sum thus obtain for modulating the very high-frequency carrier in a ring modulator. This solution is equally costly because of the use of a ring modulator: it could not be applied with a MOS transistor modulator because the latter has a rather poor linearity and would produce a transmodulation between the sound and the picture.

It is an object of the invention to provide a modulator which does not have any of the inconveniences of the existing modulators. The modulator according to the invention specifically intended for processing pictures and synthetic sounds in the case of television standards with the sound being modulated in frequency is a MOS transistor modulator and does not require an additional sound modulator.

The modulator according to the invention is characterized in that the output signal is taken from the terminals of an impedance disposed in the drain circuit of said MOS transistor, which is of the dual gate type whilst of the three electrodes of the transistor other than the drain electrode one is connected to the composite video signal input, another is connected to the very high-frequency carrier signal input and another is connected to a sound intercarrier signal input which is frequency-modulated by the sound.

In a specific embodiment the composite video signal is applied to the source electrode of the MOS transistor, the carrier signal is applied to one of the gates and the intercarrier signal is applied to the other gate.

The invention will now be described by way of non-limiting example with reference to the accompanying drawing.

The sole FIGURE shows the circuit diagram of a modulator with oscillators generating the carriers.

A positive supply is connected to the terminal 44 and feeds the transistor circuits 29, 1, 3 via resistive-capacitive decoupling elements 40–41, 25, 26, 16–17, respectively.

A very high carrier signal generator is constituted by the elements 3 to 10 of an oscillator. The expression "very high frequency" is to be understood to mean a frequency located in one of the usual television bands (bands I, III, IV, V).

The oscillator has, for example, a frequency of 600 MHz in this case.

It is constituted by a PNP transistor oscillator 3 disposed in common collector arrangement with a base-emitter coupling realized by the series arrangement of capacitors 4, 5, 10 tuned by a controllable inductor 6 connected between the junction of capacitors 4 and 5 and ground. A resistance bridge 7, 8 determines the polarization at the base and the very high-frequency carrier signal is produced at the point of connection between the emitter and a resistor 9 arranged in series in the emitter current path.

An oscillator which can be modulated in frequency constitutes a sound-modulated intercarrier signal generator and consists of the elements 29 to 39. The frequency-modulated intercarrier signal is produced at the collector of transistor 29 in the current circuit in which a tuning circuit 30, 31 is arranged. A collector-emitter coupling is provided by a capacitor bridge 32, 33. A resistor 34 is inserted in the emitter current path and a resistor bridge 35, 37 determines the polarization at the base of the transistor. The circuit 30, 31 is set at the sound intercarrier frequency, generally 4.5 MHz or 5.5 MHz or 6 MHz in accordance with the official standard NTSC, B and G, I, respectively. The capacitor 38 connected between base and ground decouples the base relative to the intercarrier frequency. The low-frequency sound signal is applied to the terminal 39 and is transmitted to the base through a resistor 36 for effecting the frequency modulation of the oscillator.

The modulator transistor 1 of the MOS dual gate type is polarized by means of a resistor 28 arranged in series in the source current path, while resistors 18, 19 dc-connect gate 20 to ground and a resistor bridge 13, 14 decoupled by a capacitor 12 applies a d.c. voltage to the gate 21 through a resistor 15, which voltage has a value between that of ground and that of power supply.

The output signal is taken from the terminals of an impedance placed in the drain circuit of transistor 1. This impedance is a resistor 24 arranged between the power supply and the drain electrode of the transistor. A circuit tuned to the very high frequency may also be used; however, the arrangement functions perfectly with a cheaper, single resistor. The output signal is transmitted to an output terminal 45 by a coupling capacitor 46. A resistor 42 between the terminal 45 and ground matches the output impedance to that of the connecting lead connected to the terminal 45.

The source electrode of transistor 1 is connected by a terminal 43 to a composite video signal generator (not shown). This signal applied to the source electrode of transistor 1 must be positive in the case of the B, G, I or NTSC standard.

The gate 20 is connected to the very high-frequency carrier signal generator (3 to 10) via resistor 19 and coupling capacitor 11 which is connected to the emitter of the oscillator 3.

The gate 21 is connected to the frequency-modulated sound intercarrier signal generator 30 to 39 via coupling capacitor 27 connected to the collector of the frequency-modulatable transistor oscillator 2. Furthermore the capacitor 27 and the resistor 15 constitute a low-pass filter.

The MOS transistor 1 itself has three functions. The source with the gate 20 behaves as a video modulator, the two gates together behave as a frequency changer for the sound intercarrier and the source with the drain behave as a duplexer of the two video and sound paths. At the terminals of the resistor 24 there are actually two RF carriers, frequency-modulated at 606 and 594 MHz, because the sound intercarrier frequency is 6 MHz. However, it is not necessary to provide filtering because the television receiver selects the correct RF carrier.

It is possible to interchange certain generators although the mode of connection described by way of example is most advantageous with respect to matching of the impedances because the external composite video signal generator itself can control the voltage at the source electrode of transistor 1 which has a lower impedance than the gates. However, starting from arrangements that can be realized by those skilled in the art, such as impedance matching and inversion of the video signal, it is possible to apply, for example, the very high-frequency carrier or the sound intercarrier to the source electrode and each of the other signals to one of the gates.

A circuit as described above can easily be realized in a flat box of approximately 25×50 mm with a shield between the 600 MHz oscilator part and the rest of the circuit.

What is claimed is:

1. In a circuit for processing video and sound signals of a video game so as to produce a composite output signal which may be applied to the antenna input of a domestic television receiver to produce a video and audio display of such video game, such processing circuit comprising a frequency modulated oscillator producing FM sound intercarrier signals from such sound signals and an oscillator producing VHF carrier signals, the improvement consisting of a transistor modulator comprising:

an MOS transistor having a source electrode, a drain electrode and two gate electrodes, one of said source and drain electrodes and said two gate electrodes constituting inputs to said transistor and the other of said source and drain electrodes constituting the output from said transistor; one of said input electrodes being connected to said FM oscillator to receive said FM sound intercarrier signals, a second one of said input electrodes being connected to said VHF oscillator to receive said carrier signals;

circuit means for applying said video signals to the third one of said input electrodes;

and impedance means connected to said other one of said source and drain electrodes, said MOS transistor being adapted to produce said composite signal across said impedance means.

2. A transistor modulator as claimed in claim 1, characterized in that the video signal is applied to the source electrode of said MOS transistor, the carrier signal is applied to one of the gate electrodes thereof, the FM sound intercarrier signal is applied to the other gate electrode thereof, and said impedance means is connected to the drain electrode thereof.

3. A transistor modulator as claimed in either of claims 1 or 2, characterized in that said impedance means is a resistor.

* * * * *